(12) United States Patent
Ting et al.

(10) Patent No.: US 11,360,562 B2
(45) Date of Patent: Jun. 14, 2022

(54) HAPTIC FEEDBACK MODULE

(71) Applicant: CHUNG-YUAN CHRISTIAN UNIVERSITY, Chung Li (TW)

(72) Inventors: Yung Ting, Chung Li (TW); Sheuan-Perng Lin, Chung Li (TW); Jun-Hong Lin, Chung Li (TW); Rahmad-Aldori Yopan, Chung Li (TW)

(73) Assignee: CHUNG-YUAN CHRISTIAN UNIVERSITY, Chung Li (TW)

( * ) Notice: Subject to any disclaimer, the term of this patent is extended or adjusted under 35 U.S.C. 154(b) by 1 day.

(21) Appl. No.: 16/953,056

(22) Filed: Nov. 19, 2020

(65) Prior Publication Data
US 2021/0373667 A1 Dec. 2, 2021

(30) Foreign Application Priority Data

May 29, 2020 (TW) ................. 109118161

(51) Int. Cl.
*G06F 3/041* (2006.01)
*H04R 17/00* (2006.01)
*G06F 3/01* (2006.01)

(52) U.S. Cl.
CPC .............. *G06F 3/016* (2013.01); *G06F 3/041* (2013.01)

(58) Field of Classification Search
None
See application file for complete search history.

(56) References Cited

U.S. PATENT DOCUMENTS

2020/0059733 A1* 2/2020 Shin ...................... H04R 17/00

\* cited by examiner

*Primary Examiner* — Carl Adams
(74) *Attorney, Agent, or Firm* — Muncy, Geissler, Olds & Lowe, P.C.

(57) ABSTRACT

A haptic feedback module with a touch panel and a piezoelectric haptic feedback module is disclosed. The piezoelectric haptic feedback module contacts with the touch panel and has a first soft circuit board and a plurality of piezoelectric units. The first soft circuit board has a plurality of first electrode areas and each first electrode area has a first length. Each of the piezoelectric units is respectively configured below each of the first electrode areas. Each of the piezoelectric units has a second length, wherein the first length is 10% to 20% of the second length.

12 Claims, 8 Drawing Sheets

NODAL SOLUTION
STEP=1
SUB=1
FREQ=494.494
USUM (AVG)
RSYS=0
DMX=18.8312
SMX=18.8312

| 0 | 2.24006 | 4.48013 | 6.72019 | 8.96025 | 11.2003 | 13.4404 | 15.6804 | 17.9205 | 20.1606 |

CYCU_ME603

FIG. 5A

NODAL SOLUTION
STEP=1
SUB=1
FREQ=494.494
USUM (AVG)
RSYS=0
DMX=18.8312
SMX=18.8312

| 0 | 2.09236 | 4.18471 | 6.27707 | 8.36942 | 10.4618 | 12.5541 | 14.6465 | 16.7388 | 18.8312 |

CYCU_ME603

FIG. 5B

NODAL SOLUTION
STEP=1
SUB=1
FREQ=494.275
USUM (AVG)
RSYS=0
DMX=17.0769
SMX=17.0769

| 0 | 1.89743 | 3.79487 | 5.6923 | 7.58974 | 9.48717 | 11.3846 | 13.282 | 15.1795 | 17.0769 |

CYCU_ME603

FIG. 5C

NODAL SOLUTION
STEP=1
SUB=1
FREQ=212.84
USUM (AVG)
RSYS=0
DMX=19.0784
SMX=19.0784

| 0 | 2.11982 | 4.23964 | 6.35945 | 8.47927 | 10.5991 | 12.7189 | 14.8387 | 16.9585 | 19.0784 |

HAPTIC FEEDBACK MODULE

BACKGROUND OF INVENTION

1. Field of the Invention

The present invention relates generally to a haptic feedback module, and more particularly to a haptic feedback module which can generate a resonance frequency lower than 500 Hz without any additional mass.

2. Description of Related Art

According to research, the haptic perception frequency for humans is lower than 500 Hz, and the optimal perception frequency is approximately around 300 Hz to 100 Hz. Vibrations with frequencies that are too low or too high cannot be perceived by the human body. In the current touch panel technology, the vibration frequency is reduced by increasing the mass of the vibration units so as to enhance the perception of the user. However, the increase in mass on the vibration units will result in a higher overall weight of the touch panel. This is not in conformity with the pursuit of light and thin touch screens, and the production processes of the touch panel are also increased. Therefore, it is necessary for those skilled in the art to find a solution to reduce the vibration frequency without any additional mass.

SUMMARY OF THE INVENTION

The main object of the present invention is to provide a haptic feedback module which can generate a resonance frequency lower than 500 Hz without any additional mass.

In order to accomplish the above object, the haptic feedback module of the present invention comprises a touch panel and a piezoelectric haptic feedback module, wherein the piezoelectric haptic feedback module touches the touch panel. Characteristically, the piezoelectric haptic feedback module comprises a first soft circuit board and a plurality of piezoelectric units. The first soft circuit board comprises a plurality of first electrode areas, each first electrode area having a first length. Each piezoelectric unit is respectively configured below each first electrode area, and each piezoelectric unit comprises a piezoelectric component. The piezoelectric component has a second length, wherein the first length is 10-20% of the second length.

Based on the design of the present invention, the resonance frequency can be reduced to the range of vibration frequency perceptible to the human body without any additional mass. Thus the problem existing in the prior art can be solved.

DETAILED DESCRIPTION OF THE INVENTION

Figure 1:
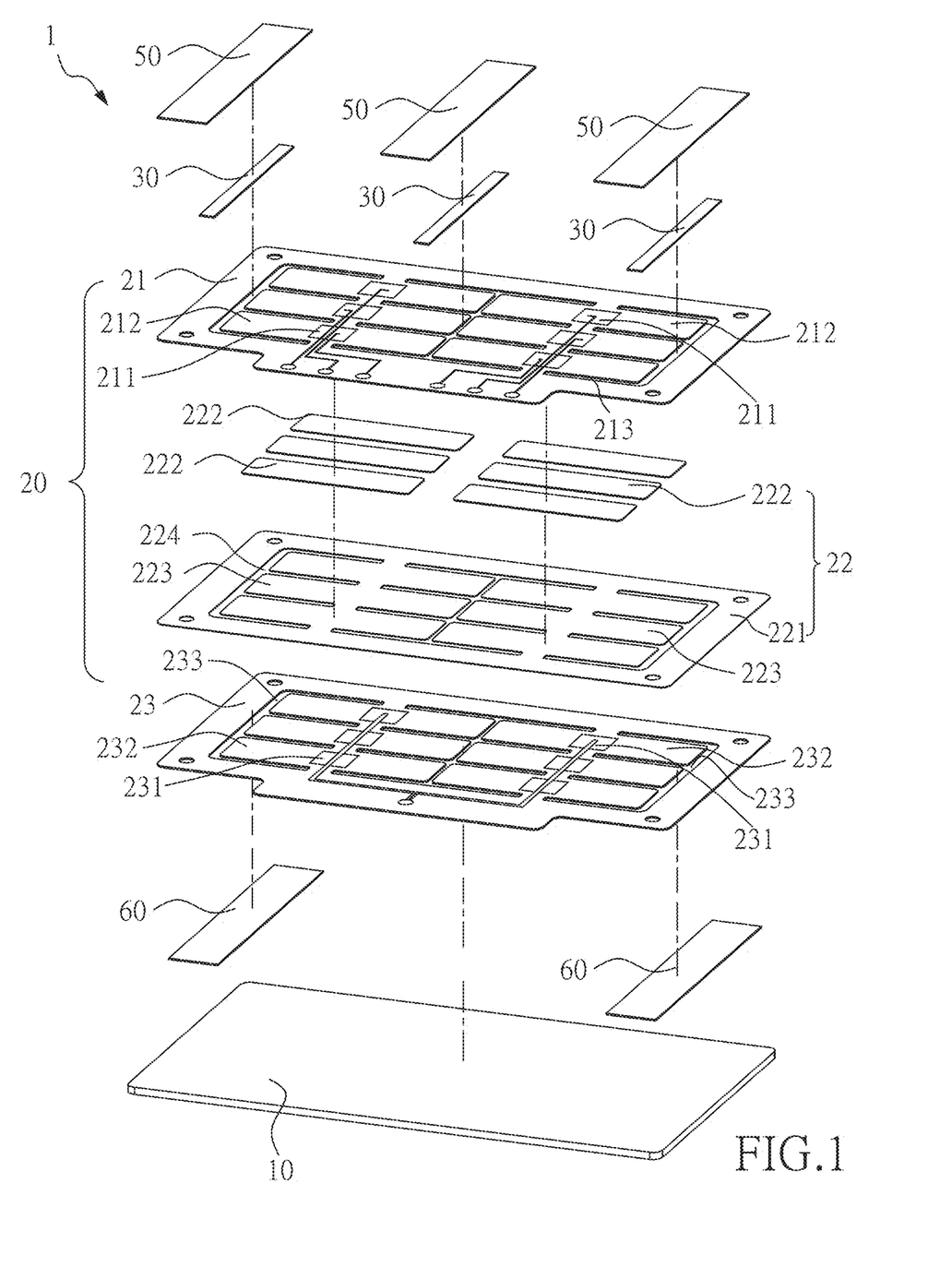
FIG. 1 is an exploded view of an embodiment of the haptic feedback module of the present invention.
Figure 5A:
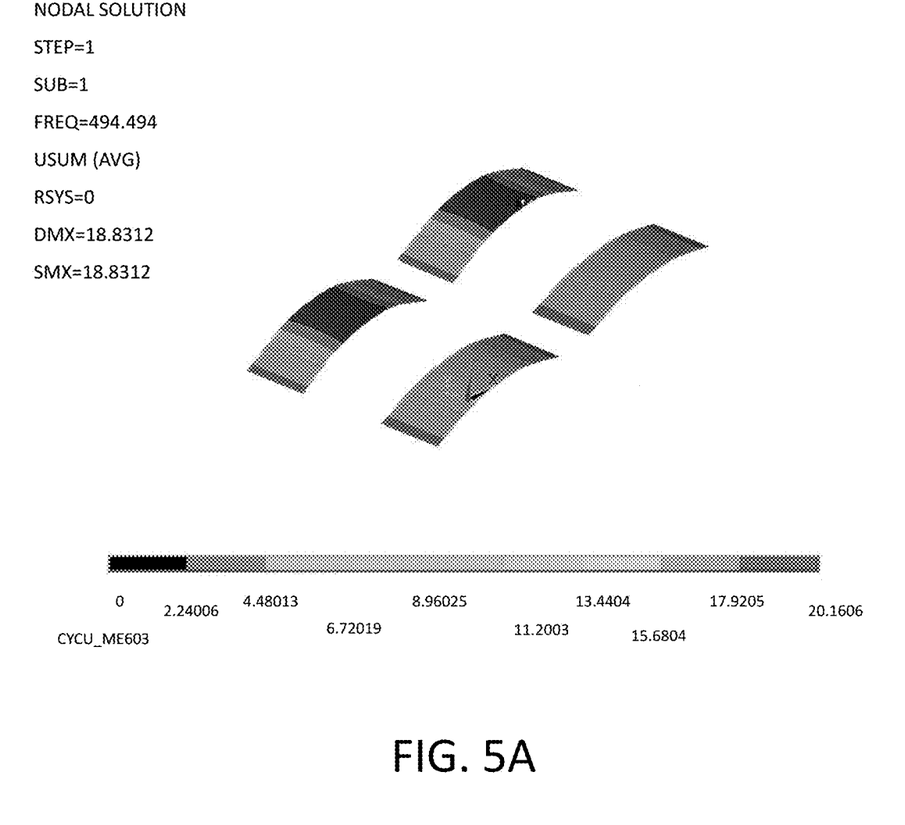
FIG. 5A is a model analysis drawing of the piezoelectric haptic feedback module of the present invention with 4 force feedback units, showing the values of ANSYS analytical calculations.
Figure 5B:
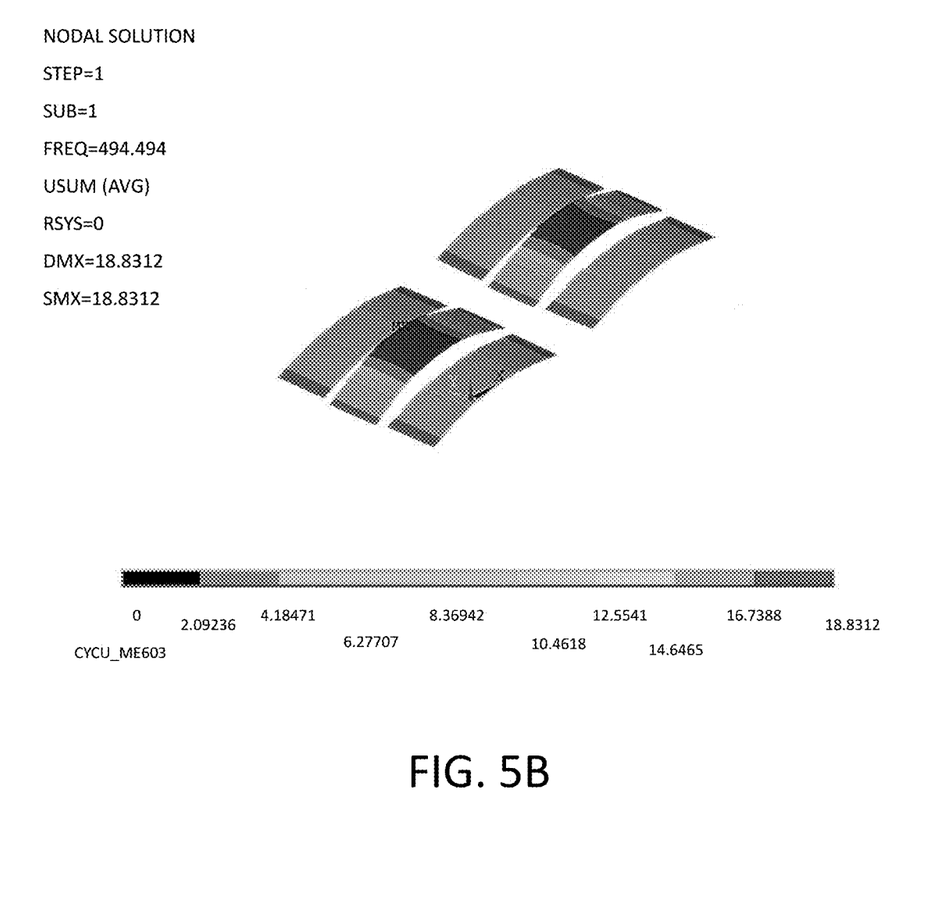
FIG. 5B is a model analysis drawing of the piezoelectric haptic feedback module of the present invention with 6 force feedback units, showing the values of ANSYS analytical calculations.
Figure 5C:
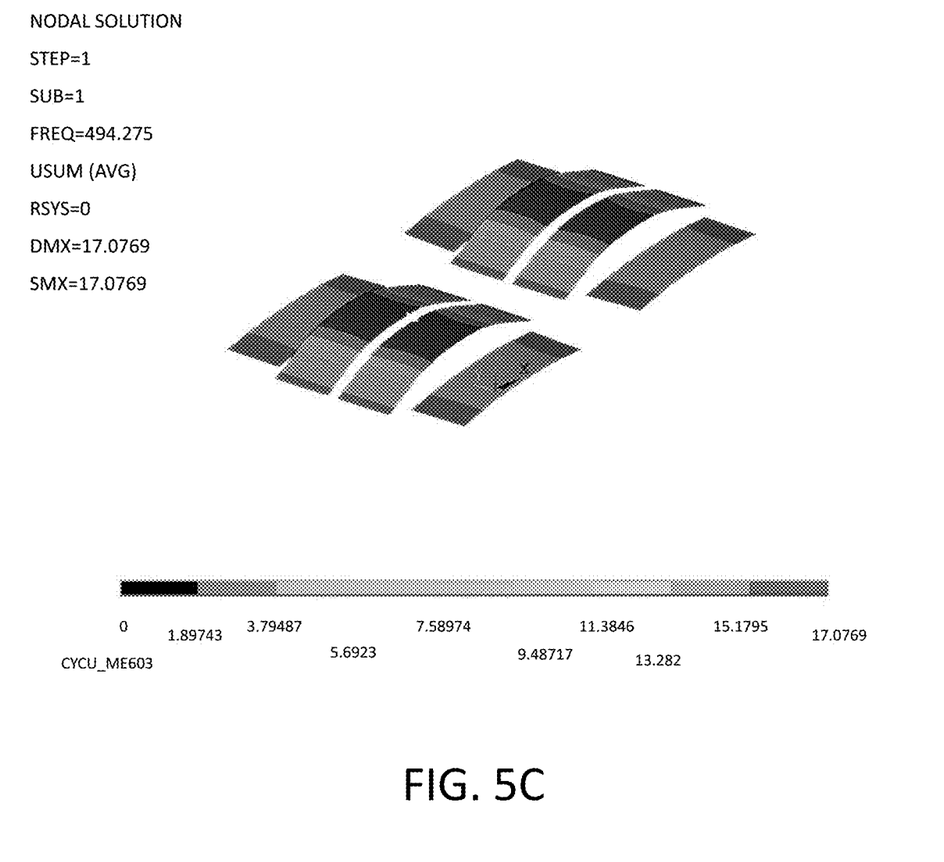
FIG. 5C is a model analysis drawing of the piezoelectric haptic feedback module of the present invention with 8 force feedback units, showing the values of ANSYS analytical calculations.

For better understanding of the technical contents of the present invention, a preferred embodiment is used for descriptions below. Now please refer to FIG. 1 to FIG. 4, FIG. 5A, FIG. 5B, FIG. 5C and FIG. 6 in combination, which include an exploded view and a top view of an embodiment of the haptic feedback module of the present invention, a schematic view of a force feedback unit of the piezoelectric haptic feedback module, a schematic view of deformation under force of the force feedback unit of the piezoelectric haptic feedback module, and model analysis drawings of the piezoelectric haptic feedback module of the present invention with 4, 6 and 8 force feedback units, showing the values of ANSYS analytical calculations, and a model analysis drawing of the piezoelectric haptic feedback module of the present invention based on the embodiment in FIG. 1, showing the values of ANSYS analytical calculations Please refer to FIG. 1 to FIG. 4. In the present embodiment, the haptic feedback module 1 of the present invention comprises a touch panel 10 and a piezoelectric haptic feedback module 20, wherein the piezoelectric haptic feedback module 20 is located below the touch panel 10. The piezoelectric haptic feedback module 20 comprises a first soft circuit board 21, a plurality of piezoelectric units 22 and a second soft circuit board 23, wherein the first soft circuit board 21 comprises a plurality of first electrode areas 211, each first electrode area 211 has a first length L1, and each piezoelectric unit 22 is respectively disposed below each first electrode area 211. Each piezoelectric unit 22 is located between the first soft circuit board 21 and the second soft circuit board 23, each of the piezoelectric units 22 comprises a piezoelectric component 222, and the piezoelectric component 222 has a second length L2, wherein the first length L1 is 10-20% of the second length L2. The second soft circuit board 23 comprises a plurality of second electrode areas 231, wherein the second electrode area also has a first length L1, and the first length L1 of each second electrode area 231 is 10-20% of the second length L2. When the user's finger touches the touch panel 10, one of the plurality of piezoelectric units 22 will generate a piezoelectric effect, and the piezoelectric haptic feedback module 20 will generate a resonant effect of force feedback. As shown in FIG. 5A, FIG. 5B and FIG. 5C, the resonance frequency is lower than 500 Hz.

Referring to FIG. 1 to FIG. 4, in the present embodiment, the center line of each first electrode area 211 and the center line S of each second electrode area 231 respectively coincide with the center line Y of each piezoelectric unit 22, and each first electrode area 211 and each second electrode area 231 is 15-40% of the area of each piezoelectric unit 22. In the preferred embodiment, each first electrode area 211 and each second electrode area 231 is 15-35% of the area of each piezoelectric unit 22. Thus, when the user's finger touches the touch panel 10, one of the plurality of piezoelectric units 22 generates a piezoelectric effect. Due to the feature that each first electrode area 211 and each second electrode area 231 is located in the center of the piezoelectric unit 22, the actuated piezoelectric unit 22 will generate an arcuate deformation with a vibration frequency lower than 500 Hz. It is to be noted here that the center line of each first electrode area 211, the center line S of each second electrode area 231 and the center line Y of each piezoelectric unit 22 do not need to coincide completely with each other as long as each first electrode area 211 and each second electrode area 231 is respectively located in the center of the length of the piezoelectric unit 22. Using a rectangular shape as an example, the center of the length referred to and applicable in the present invention means that the distances from the two opposite minor axes of each first electrode area 211 and from those of each second electrode area 231 to the two relative minor axes of the piezoelectric unit 22 are equal or within an error range below 10%.

Because the first electrode areas 211 and the second electrode areas 231 are respectively critical components of the first soft circuit board 21 and the second soft circuit board 23, and as shown in FIG. 5A, FIG. 5B and FIG. 5C, due to the feature that the first length L1 of the first electrode area 211 of the present invention is 10-20% of the second length L2 of each piezoelectric component 222, in the haptic feedback module 1 of the present invention, the resonance frequency of the piezoelectric haptic feedback module 20 is maintained below 800 Hz without any additional mass. Therefore, it solves the problem existing in the prior art. In addition, all of the components of the piezoelectric haptic feedback module 20 are thin and can be installed on light and thin touch panels. This is in line with the trend of designing light and thin touch panels.

Figure 2:
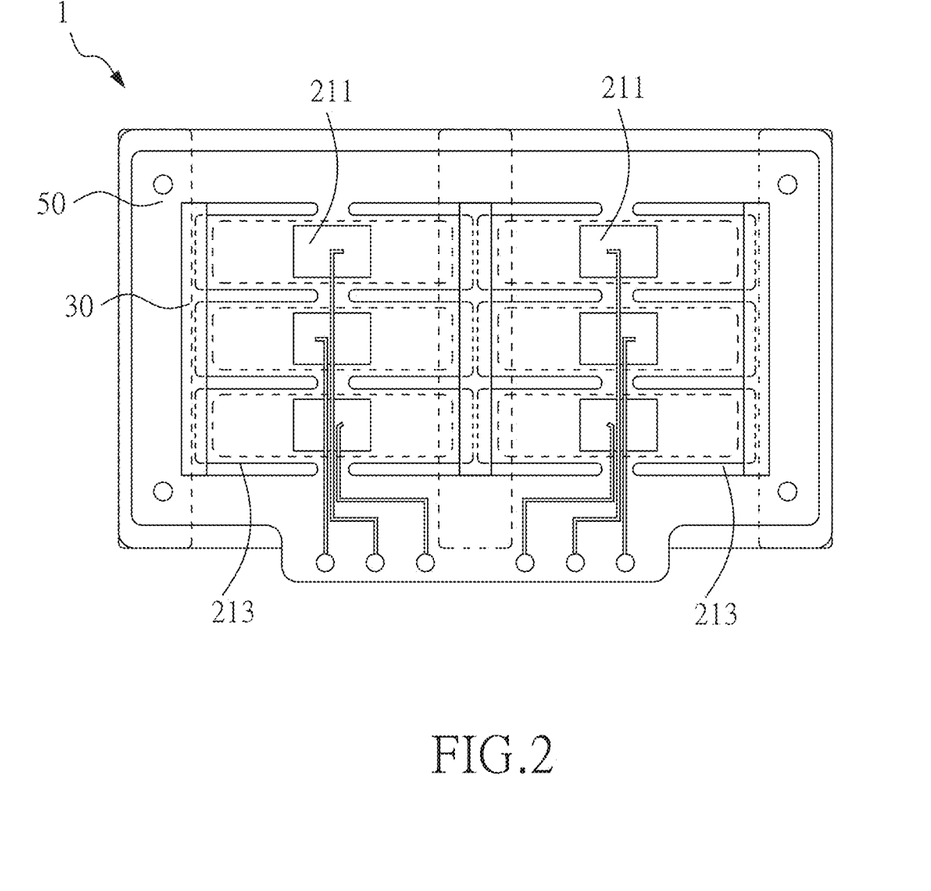
FIG. 2 is a top view of an embodiment of the haptic feedback module of the present invention.
Figure 3:
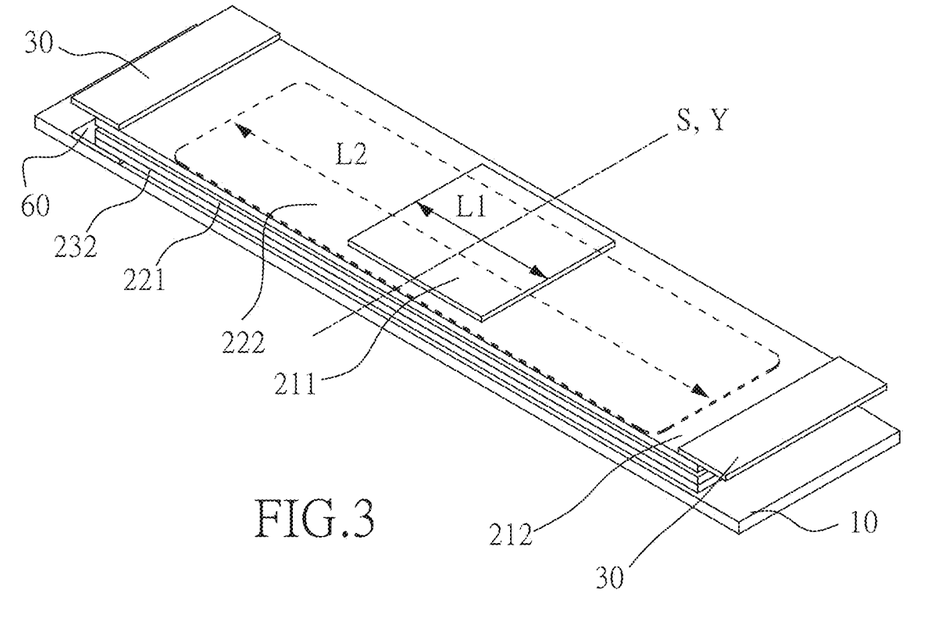
FIG. 3 is a schematic view of a force feedback unit of the piezoelectric haptic feedback module of the present invention.
Figure 4:
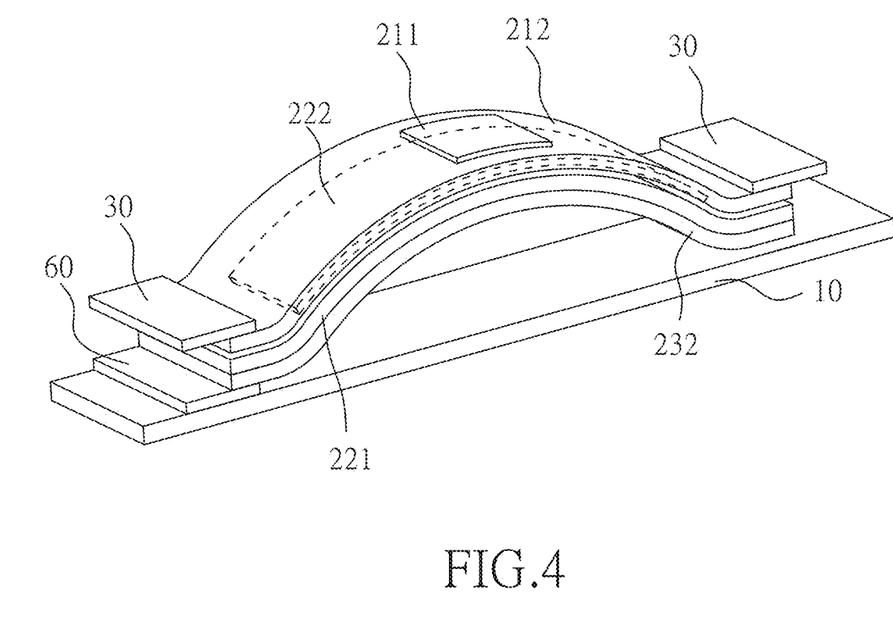
FIG. 4 is a schematic view of deformation under force of the force feedback unit of the piezoelectric haptic feedback module of the present invention.

Moreover, as shown in FIG. 1 and FIG. 2, in order for each piezoelectric unit 22 of the piezoelectric haptic feedback module 20 to vibrate independently without interfering with each other, the first soft circuit board 21 and the second soft circuit board 23 comprise a plurality of cutting areas 212, 232, and there is a gap 213, 233 between adjacent cutting areas 212, 232, wherein the gap 213, 233 is a completely hollowed-out area in the first soft circuit board 21 and in the second soft circuit board 23. Each first electrode area 211 and each second electrode area 231 are respectively configured in each cutting area 212, 232, and each cutting area 212, 232 touches each piezoelectric unit 20.

Referring to FIG. 1, the piezoelectric unit 22 further includes an elastic component 221, wherein the piezoelectric component 222 is located between the elastic component 221 and the second soft circuit board 23. According to an embodiment of the present invention, the piezoelectric component 222 is PZT or PVDF film or made of piezoelectric materials with the same nature. The present invention is not limited to the above materials. In addition, as shown in FIG. 1, to match the cutting areas in the first soft circuit board 21 and the second soft circuit board 23, there are also corresponding cutting areas 223 in the elastic component 221 and a gap 224 between adjacent cutting areas 223, wherein the gap 224 is a completely hollowed-out area in the elastic component 221.

Figure 6:
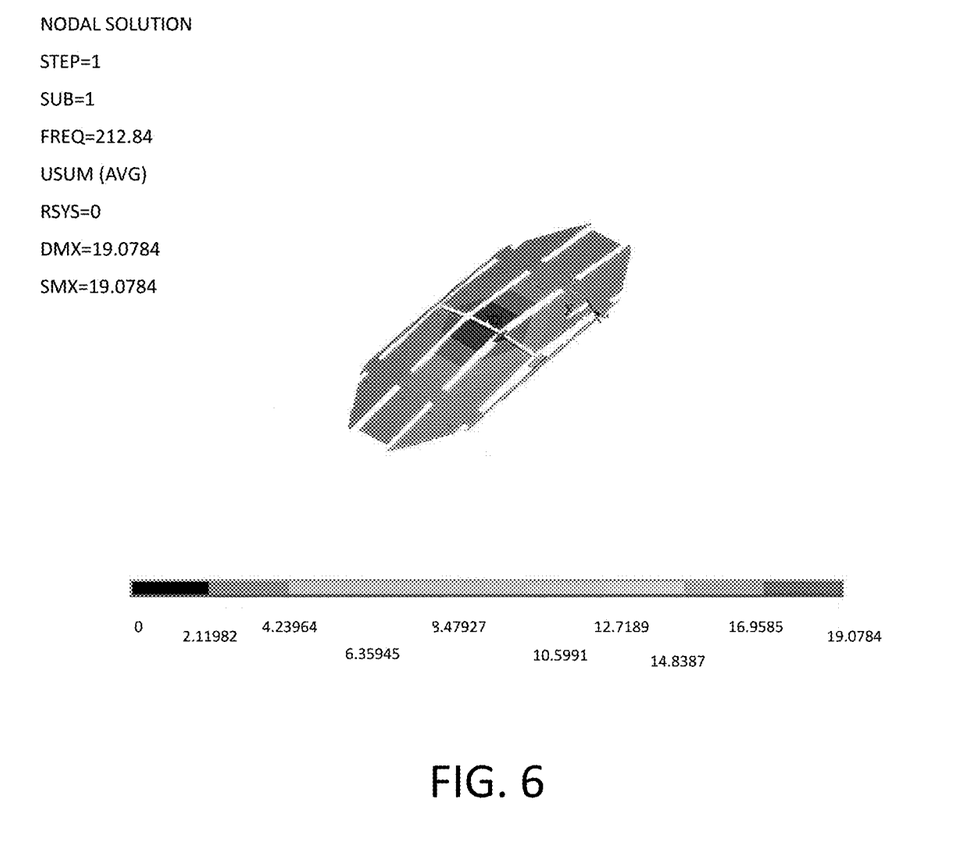
FIG. 6 is a model analysis drawing of the piezoelectric haptic feedback module of the present invention based on the embodiment in FIG. 1, showing the values of ANSYS analytical calculations.

According to an embodiment of the present invention, as shown in FIG. 1 and FIG. 2, the haptic feedback module 1 of the present invention further comprises a plurality of first pressing bars 30, wherein each first pressing bar 30 is respectively configured on the two opposite sides of each cutting area 213 of the first soft circuit board 21 and each cutting area 232 of the second soft circuit board 23. In the present embodiment, each cutting area 213 of the first soft circuit board 21 and each cutting area 232 of the second soft circuit board 23 is rectangular, and each first pressing bar 30 is respectively configured on the sides of the two minor axes of each cutting area 213 of the first soft circuit board 21. Thus, as shown in FIG. 6, when one of the plurality of piezoelectric units 22 generates a piezoelectric effect, the piezoelectric haptic feedback module 20 can generate a resonance frequency lower than 500 Hz. When a plurality of first pressing bars 30 apply a clamping force on the upper and lower ends of the piezoelectric haptic feedback module 20 to join it with the touch panel 10, a vibration frequency lower than 500 Hz can be obtained (as shown in FIG. 6) to strengthen the haptic feeling of the user. According to an embodiment of the present invention, as shown in FIG. 1 and FIG. 2, the haptic feedback module 1 of the present invention further comprises a plurality of first assisting pressing bars 50, which respectively cover each first pressing bar 30, to strengthen the clamping of each first pressing bar 30 on the piezoelectric haptic feedback module 20. Referring to FIG. 1, in the present embodiment, the haptic feedback module 1 further comprises two second assisting pressing bars 60, wherein each second assisting pressing bar 60 respectively covers the gap 233 on the leftmost and the gap 233 on the rightmost of the second soft circuit board 23.

It is to be noted here that, as shown in FIG. 1 and FIG. 2, to meet the design needs for various touch panels, the piezoelectric units 22 in the piezoelectric haptic feedback module of the present invention 20 can be designed in the form of an array, and each piezoelectric unit 22 can be designed in the form of an M×N array, wherein M and N are both natural numbers. For example, the array in FIG. 2 is a 2×3 array, wherein M=2 and N=3.

Figure 7A:
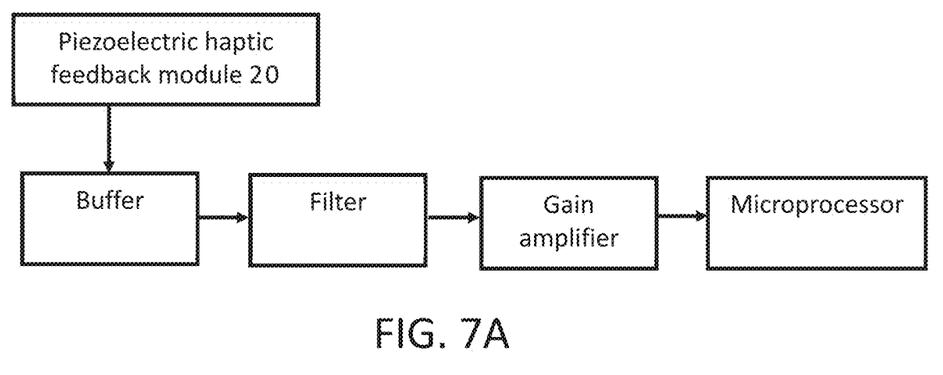
FIG. 7A is a schematic view of the sensing circuit adopted in the piezoelectric haptic feedback module of the present invention when used as the sensor of the haptic feedback module.
Figure 7B:
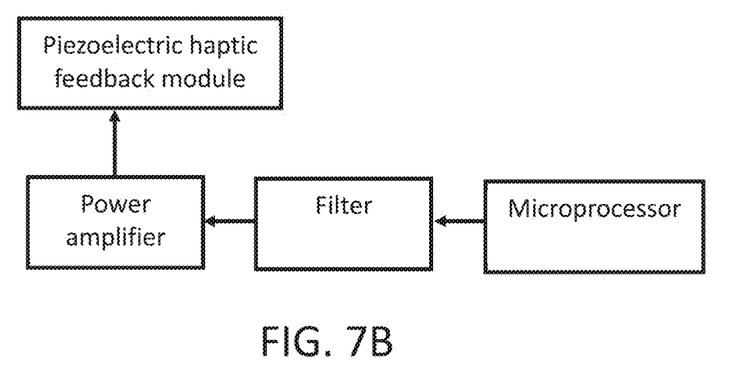
FIG. 7B is a schematic view of the driving circuit adopted in the piezoelectric haptic feedback module of the present invention when used as the actuator of the haptic feedback module.

Please refer to FIG. 1 and FIG. 2, and to FIG. 7A and FIG. 7B together. FIG. 7A is a schematic view of the sensing circuit when the piezoelectric haptic feedback module of the present invention is used as a haptic feedback module, and FIG. 7B is a schematic view of the driving circuit when the piezoelectric haptic feedback module of the present invention is used as the actuator of a haptic feedback module.

It is to be noted here that, when one of the plurality of piezoelectric units 22 generates a positive piezoelectric effect, the piezoelectric haptic feedback module 20 can be used as the sensor of the haptic feedback module 1, and in this case, the sensing circuit of the piezoelectric haptic feedback module 20 can be configured as shown in FIG. 7A. When one of the plurality of piezoelectric units 22 generates a negative piezoelectric effect, the piezoelectric haptic feedback module 20 can be used as the actuator of the haptic feedback module 1, and in this case, the driving circuit of the piezoelectric haptic feedback module 20 can be configured as shown in FIG. 7B. However, the forms of the sensing circuit and driving circuit applicable to the present invention are not limited to the above embodiments.

Based on the design of the present invention, the resonance frequency of the haptic feedback module can be reduced to a range lower than 500 Hz without any additional mass. Thus the problem existing in the prior art can be solved.

Although the invention has been explained in relation to its preferred embodiment, it is to be understood that many other possible modifications and variations can be made without departing from the spirit and scope of the invention as hereinafter claimed.

The invention claimed is:

1. A haptic feedback module, comprising a touch panel and a piezoelectric haptic feedback module, wherein the piezoelectric haptic feedback module is located below the touch panel, the piezoelectric haptic feedback module comprising:
a first soft circuit board, comprising a plurality of first electrode areas, wherein each of the first electrode areas has a first length L1, and
a plurality of piezoelectric units, wherein each of the piezoelectric units is configured below each of the first electrode areas, and each of the piezoelectric units comprises a piezoelectric component, the piezoelectric component having a second length L2, wherein the first length L1 is 10-20% of the second length L2, wherein the each of the piezoelectric units is electronically connected to the each of the first electrode areas and when one of the plurality of piezoelectric units generates a piezoelectric effect, a resonance frequency generated by the piezoelectric haptic feedback module is lower than 500 Hz.

2. The haptic feedback module defined in claim 1, wherein a center line of each of the first electrode areas coincides with a center line of each of the piezoelectric units.

3. The haptic feedback module defined in claim 2, wherein the piezoelectric haptic feedback module further includes a second soft circuit board, each of the piezoelectric units is located between the first soft circuit board and the second soft circuit board, and the second soft circuit board comprises a plurality of second electrode areas, wherein each of the second electrode areas has a first length L1, wherein the first length L1 of each of the second electrode areas is 10-20% of the second length L2.

4. The haptic feedback module defined in claim 3, wherein the center line of each of the second electrode areas coincides with the center line of each of the piezoelectric units.

5. The haptic feedback module defined in claim 3, wherein the piezoelectric unit comprises an elastic component, wherein the piezoelectric component is located between the elastic component and the second soft circuit board.

6. The haptic feedback module defined in claim 1, wherein the piezoelectric haptic feedback module further includes a second soft circuit board, each of the piezoelectric units is located between the first soft circuit board and the second soft circuit board, and the second soft circuit board comprises a plurality of second electrode areas, wherein each of the second electrode areas has a first length L1, wherein the first length L1 of each of the second electrode areas is 10-20% of the second length L2.

7. The haptic feedback module defined in claim 6, wherein the center line of each of the second electrode areas coincides with the center line of each of the piezoelectric units.

8. The haptic feedback module defined in claim 6, wherein the piezoelectric unit comprises an elastic component, wherein the piezoelectric component is located between the elastic component and the second soft circuit board.

9. The haptic feedback module defined in claim 8, wherein the first soft circuit board and the second soft circuit board comprise a plurality of cutting areas, wherein adjacent cutting areas are separated by a gap, each of the first electrode areas and each of the second electrode areas is respectively configured in each of the cutting areas, and each of the cutting areas touches each of the piezoelectric units.

10. The haptic feedback module defined in claim 9, further comprising a plurality of first pressing bars, wherein each first pressing bar is respectively configured on the two opposite sides of each of the cutting areas of the first soft circuit board such that when one of the plurality of piezoelectric units generates a piezoelectric effect, the resonance frequency generated by the piezoelectric haptic feedback module is lower than 500 Hz.

11. The haptic feedback module defined in claim 10, further comprising a plurality of first assisting pressing bars, wherein each of the first assisting pressing bars respectively covers each of the first pressing bars such that when one of the plurality of piezoelectric units generates a piezoelectric effect, the resonance frequency generated by the piezoelectric haptic feedback module is lower than 500 Hz.

12. The haptic feedback module defined in claim 11, further comprising a plurality of second assisting pressing bars, wherein the second assisting pressing bars respectively cover the gaps located on the leftmost and rightmost inside the second soft circuit board.

* * * * *